March 21, 1961 — L. G. BARDEN — 2,976,060
DETACHABLE HITCH ELEMENT
Filed June 8, 1959 — 2 Sheets-Sheet 1
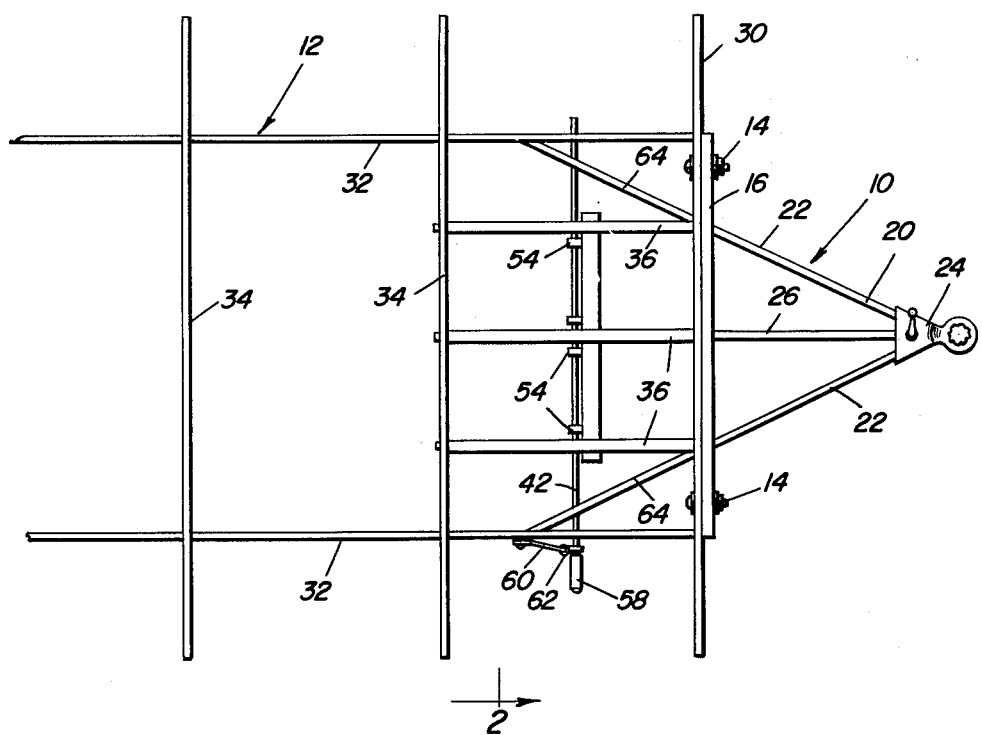
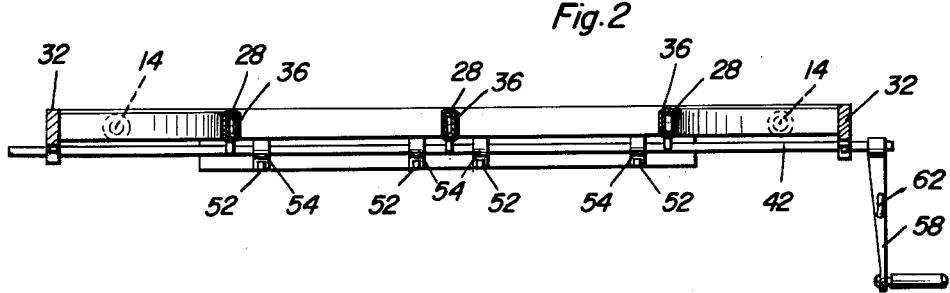
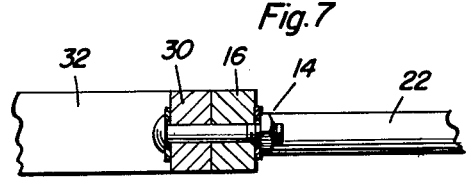
Lyle G. Barden
INVENTOR.

March 21, 1961
L. G. BARDEN
2,976,060
DETACHABLE HITCH ELEMENT
Filed June 8, 1959
2 Sheets-Sheet 2
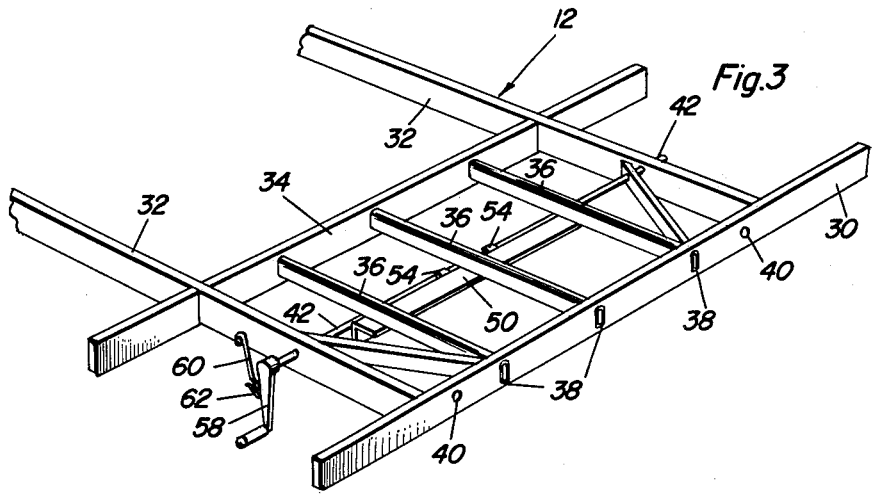
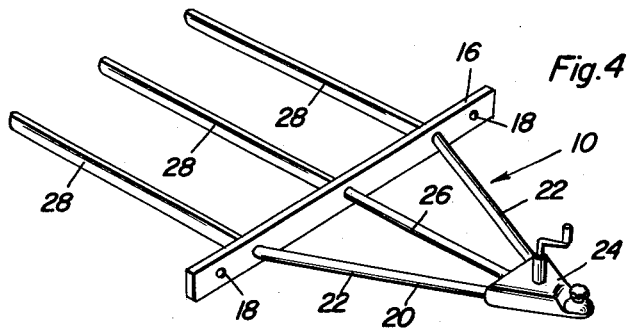
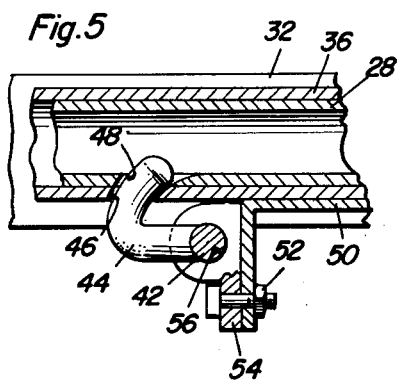
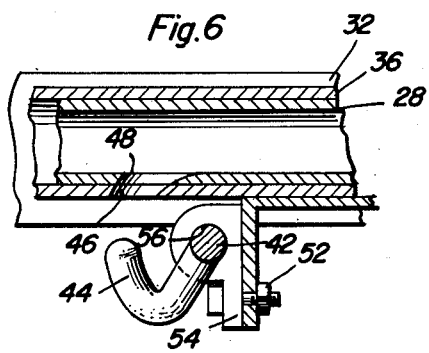
Lyle G. Barden
INVENTOR.
BY *Clarence A. O'Brien*
*and Harvey B. Jacobson*
Attorneys United States Patent Office 2,976,060
Patented Mar. 21, 1961

2,976,060
DETACHABLE HITCH ELEMENT
Lyle G. Barden, Box 112, Mansfield, Pa.
Filed June 8, 1959, Ser. No. 818,770
2 Claims. (Cl. 280—491)

This invention relates to a new and useful detachable hitch element for house trailers and the like and more particularly relates to a hitch element that may be conveniently and readily removed from the frame of a house trailer so that the trailer, while being lived in and temporarily stationary, will have a more pleasing outward appearance.

It is becoming increasingly popular, for families who frequently move or for persons who have retired and desire a change of scenery every once in awhile to use as their permanent home one of the many home-like house trailers that are being manufactured at this time. In many instances, families living in house trailers make use of the many convenient trailer parks which have been established in this country and move at their leisure from one place to the other staying possibly anywhere from a month to several years in one location.

Like families living in the ordinary permanent home, the owners of house trailers, while staying at a particular trailer park for periods longer than a month or so, take pride in the outward appearance of their mobile home as well as the appearance of the interior thereof. With the larger house trailers of today a large and sturdy hitch frame is required to afford the necessary support for the forward end of the house trailer while it is being towed. Although the presence of such a hitch frame is expected and accepted by everyone familiar with house trailers, a much more pleasing appearance can be had if the hitch frame can be removed from the house trailer so that the space normally occupied thereby can be turned into a sitting or lawn area.

The main object of this invention is to provide a detachable hitch element or frame for a house trailer that may be readily removed and stored in an unobtrusive manner so as to provide a more desirable outward appearance.

A further object in accordance with the preceding object is to provide a means for securing a detachable hitch element to a trailer frame whereby the necessary support and safety factors will not be reduced.

A still further object, in accordance with the preceding objects, is to provide a detachable hitch element or frame for a house trailer that may be secured and used in connection with many existing house trailers with only a few minor alterations to the house trailer frame itself.

A final object to be specifically enumerated herein in accordance with the preceding objects is to provide a detachable hitch element or frame for a house trailer that will lend itself to conventional forms of manufacture, be of simple construction and economically feasible so as to provide a hitch element that may be easily produced, simple to operate and in a price range suited to most house trailer owners of today.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of the detachable hitch element comprising the instant invention shown mounted upon the forward end of a conventional type of house trailer frame;

Figure 2 is an enlarged transverse vertical sectional view of the hitch element as seen in Figure 1 taken substantially upon the plane indicated by the section line 2—2 of Figure 1;

Figure 3 is an enlarged perspective view of the forward end of a conventional form of house trailer frame being slightly modified so as to be adapted for use with the hitch element of the instant invention;

Figure 4 is a perspective view of the hitch element;

Figure 5 is an enlarged fragmentary longitudinal vertical sectional view taken substantially through the center of one of the rearwardly projecting bars of the hitch element showing the position of the hooks locking the tubular bars in position within the longitudinally extending frame members of the trailer;

Figure 6 is an enlarged fragmentary vertical longitudinal sectional view like that of Figure 5 but showing the hooks in the unlocked position; and Figure 7 is an enlarged fragmentary longitudinal vertical sectional view taken substantially upon a plane lying upon the longitudinal axis of the mounting bolts which secure the mounting beam to the forwardmost transversely extending beam of the trailer frame.

With attention now drawn to Figure 1, the hitch element comprising the instant invention is generally designated by the reference numeral 10 and is removably secured to a conventional form of house trailer frame generally designated by the reference numeral 12 by means of fasteners 14. The hitch element 10 comprises a mounting beam 16 apertured as at 18 having a V-shaped hitch frame 20 projecting forwardly therefrom and fixedly secured thereto. The hitch frame 20 comprises a pair of side legs 22 which are connected together at their forward ends and secured to the mounting beam 16 at their rearward ends by any convenient means such as by welding. Secured to the juncture of the two side legs 22 on the forward part of the hitch frame 20 is a conventional form of socket hitch element 24. A third leg 26 has one end secured at the juncture of the two side legs 22 and bisects the angle formed thereby with the other end suitably secured to the mounting beam 16 intermediate the corresponding ends of the side legs 22. Extending rearwardly from the mounting beam 16 are three spaced parallel longitudinally extending tubular bars 28, each of the bars 28 being fixedly secured to mounting beam 16 at their forward ends and in alignment with the point at which the corresponding legs of the hitch frame 20 are secured thereto.

The house trailer frame 12 comprises a forward transversely extending frame member 30 that extends between and beyond the main side members 32 thereof. The house trailer frame 12 is provided with, throughout its length, additional transversely extending frame members 34 and there is secured between frame member 30 and the adjacent frame member 34 a plurality of spaced, parallel and longitudinally extending tubular frame members 36. Frame member 30 is provided with suitable openings 38 that are in registry with tubular members 36 and also suitable apertures 40 which are registrable with apertures 18.

Journaled for rotation through side frame members 32 and beneath longitudinally extending frame members 36 and extending transversely of frame 12 is shaft 42 which has a plurality of hook elements 44 secured thereto and projecting radially therefrom. Each of the longitudinally extending frame members 36 is provided with an aperture 46 that is in alignment with one of the hook members 44 and each of the tubular bars is provided with an aperture 48 that is registrable with the corresponding aperture 46.

Secured between the longitudinally extending tubular frame members 36 is a support 50 which has removably secured thereto by means of fasteners 52 a plurality of journaling elements 54 which are suitably apertured as at 56 to receive therethrough shaft 42 and support the latter between the side members 32.

One end of shaft 42 projects beyond the adjacent side member 32 and is provided with a crank handle 58 providing a means for effecting the rotation of shaft 42, and a retaining element 60 is secured to the adjacent side member 32 at one end and engageable with retaining ring 62 carried by the crank handle 58 to retain the shaft 42 in a rotated position with the hooks 44 received through the aligned apertures 46 and 48.

With attention now drawn to Figure 1 in particular, it will be seen that the tubular bars 28 are slidably received within the longitudinally extending frame members 36 and that when the mounting beam 16 is juxtapositioned to transverse beam 30 the apertures 18 and 40 are aligned and have passed and secured therethrough fasteners 14.

If they are not already provided, it is to be understood that the trailer frame 12 will be provided with diagonally disposed brace elements 64 which are in alignment with the side legs 22. The provision of the diagonally disposed brace elements 64 insures that any lateral stresses placed upon the hitch 10 will be properly distributed and braced in the trailer frame 12.

In operation, when it is desired to remove the hitch 10, the shaft 42 is rotated to withdraw the hooks 44 from aligned apertures 46 and 48 and the fasteners 14 are removed whereupon the hitch can be slid from within the frame 12. When it is desired to attach the hitch 10 to the frame 12, the process is reversed.

Thus it can be seen that herein described is a detachable but sturdy trailer hitch element that may be easily removed from a house trailer when it is to remain in one place for an extended period of time so as to improve upon the outward appearance of the trailer.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a trailer frame having a transversely extending beam on the forwardmost end thereof, a plurality of longitudinally extending parallel tubular frame members secured to said transverse beam, openings formed in said beam in alignment with said tubular frame members, a detachable hitch element comprising a mounting beam removably secured to said transverse beam in surface to surface contacting relation thereto, a hitch frame fixedly secured to said mounting beam and extending forwardly therefrom having a first hitch element on the forward end thereof for connection with a second hitch element on a towing vehicle, securing means on said mounting beam slidably received within said longitudinally extending frame members, said hitch frame comprising a substantially V-shaped frame having two legs joined at one end, the apex of said hitch frame having said first hitch element fixedly secured thereto, the other ends of the legs of said hitch element being fixedly secured to said mounting beam, means removably attaching said mounting beam to said transverse beam, said securing means including a plurality of spaced, parallel longitudinally extending bars projecting from the rear of said mounting beam adapted to be telescopingly received within said longitudinally extending, tubular trailer frame members through openings in alignment with the latter formed in said transversely extending frame member and removably secured therein, said hitch frame including a third leg secured between the apex of said hitch frame and said mounting beam that bisects the angle formed by said apex, each of said legs being secured to said beam at points therealong in alignment with one of said bars, an aperture formed through corresponding surfaces of each of said bars and said longitudinal members, the aperture in each of said bars being aligned with the corresponding aperture in said frame members, hook means on said trailer frame removably passed through said aligned apertures securing said bars within said longitudinal frame members, said last mentioned means comprising a transversely extending shaft journaled on said trailer frame having a plurality of hooks thereon in alignment with said apertures receivable therein upon rotation of said shaft.

2. The combination of claim 1 including means for rotating said shaft and retaining it in rotated position with said hooks received through said aligned apertures.

References Cited in the file of this patent

UNITED STATES PATENTS

| | | |
|---|---|---|
| 2,123,615 | Small | July 12, 1938 |
| 2,417,646 | Hallner | Mar. 18, 1947 |
| 2,760,789 | Wampler | Aug. 28, 1956 |
| 2,850,293 | Hall | Sept. 2, 1958 |
| 2,896,969 | Carty | July 28, 1959 |

FOREIGN PATENTS

| | | |
|---|---|---|
| 436,746 | Great Britain | Oct. 17, 1935 |